Oct. 6, 1931.  H. WOCHNER  1,825,988
SPINDLE GAUGE FOR AUTOMOBILE AXLES
Filed Dec. 3, 1928
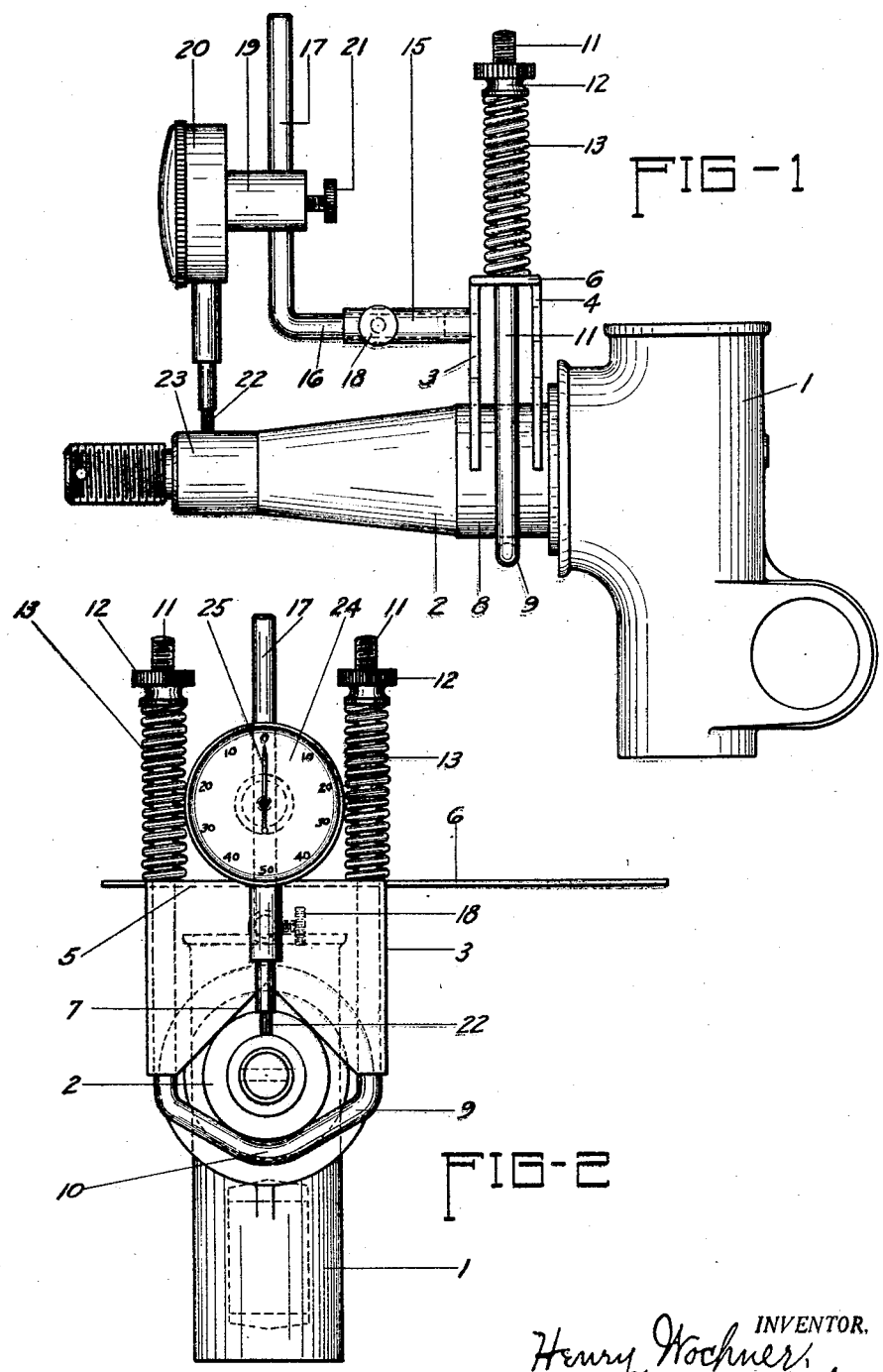
INVENTOR.
Henry Wochner,
BY Walter N. Haskell.
his ATTORNEYS.

Patented Oct. 6, 1931

1,825,988

UNITED STATES PATENT OFFICE

HENRY WOCHNER, OF ROCK ISLAND, ILLINOIS, ASSIGNOR TO BEAR MANUFACTURING COMPANY, OF ROCK ISLAND, ILLINOIS, A CORPORATION

SPINDLE GAUGE FOR AUTOMOBILE AXLES

Application filed December 3, 1928. Serial No. 323,246.

My invention has reference to spindle gauges for automobile axles and has for its purpose to provide a simple and efficient means for determining whether the spindle is bent out of a straight line, and the amount of the defect, if any. If a slight variation from normal is indicated it will ordinarily make little difference in the operation of the vehicle, but if a considerable departure from a true alignment is indicated, the remedy consists in the removal of the spindle and replacement thereof with a perfect one. The reading of the gauge can be made without removing the spindle from the axle.

The particular construction, arrangement, and manner of operation of the invention will more fully appear from the following specification, reference being had to the drawings accompanying the same, in which:

Fig. 1 shows the invention in side elevation, in position when in use.

Fig. 2 is a front view thereof.

The reference number 1 indicates a sleeve or knuckle forming part of a wheel bearing, detached from the axle, and 2 a spindle projected outwardly therefrom, and upon which the hub of a wheel rotates, when the wheel is in position thereon. The invention includes a spindle engaging member formed of a pair of parallel plates 3 and 4, united at their upper edges by a plate 5, which is projected at one end into a handle 6. The lower edges of the plates 3 and 4 are provided with coinciding angular recesses 7, whereby said member is supported on a circular portion 8 of the spindle, with the center line of the plates 3 and 4 in line with the axis of the spindle. Engaging with the lower side of the spindle is a yoke 9, having a bend 10 in opposition to the angles of the recesses 7. The yoke is projected upwardly into arms 11, which pass through openings in the plate 5, and are threaded at their ends to receive thumbnuts 12. Between said nuts and the plate 5 is interposed a pair of coiled springs 13, the force of which tends to move the arms 11 upwardly. The plates 3 and 4 and the yoke 9 are thereby caused to engage the space 8 on the spindle with a yieldable force.

Projected outwardly from the plate 3 is a tubular support 15, in which is held the bent end 16 of a rod 17, said end being capable of being held in adjusted positions in said support, either axially or longitudinally, by means of a set-screw 18 in the support. Slidably mounted on the rod 17 is a stem 19 to which is fixed a gauge 20 said stem being held in place on the rod by means of a set-screw 21 in the end of said stem. The gauge is fitted with a finger 22, which is adjusted so that the end thereof is lightly in contact with a circular space 23 on the spindle. The gauge mechanism is of a well-known type, and the peripheries of the spaces 8 and 23, which usually serve as roller bearing mountings, are concentric with the axis of the spindle when such spindle is in its true position.

The engagement of the plates 3 and 4 and the yoke 9 with the spindle is of such a character as to permit of said parts being rotated on the spindle, by means of the handle 6, the gauge mechanism being carried round therewith. If the spindle has been bent in the direction in which the tool is turning the increased pressure on the finger 22 will be shown on the dial 24 of the gauge, by means of an indicator 25. If a variation of several degrees is shown the spindle is removed, and a new one put in its place. If the spindle is bent in the opposite direction the indicator will turn to the other side of the zero mark on the gauge, and show the amount thereof. If there is no fault in the spindle a complete rotation of the tool can be made without affecting the indicator.

On account of the double bearing of the plates 3 and 4 on one side of the spindle and the position of the yoke 9 between said plates and bearing on the opposite side of the spindle, the tool, and gauge connected therewith, are held in the proper position while the same are being rotated. Ordinarily a half-revolution of the tool will be sufficient to disclose a fault in the spindle, and furnish a reading thereof on the gauge.

In some vehicles the spindle is longer than in others, and there is a greater distance between the spaces 8 and 23. The tool can be accommodated to such greater length by reversing the position of the rod 17, the long end thereof being secured in the support 15, and the gauge secured to the short end 16.

To secure the tool in place on a spindle the arms 11 are forced downwardly, separating the plates 3 and 4 and yoke 9, permitting the same to be slipped over the end of the spindle, and to a seat on the space 8, which the tool is then permitted to grasp. The proper adjustment of the gauge is then made, with the same properly centered above the spindle. The tool can be disengaged from the axle in the same manner.

The gauge is preferably set with the dial towards the outer end of the spindle, as shown in the figures, so that it can be easily read from the side of the vehicle, even when the tool is in an inverted position.

The tension of the springs 13 is such as to hold the tool in operative position on the spindle, and at the same time permit it to rotate readily thereon, and such tension can be increased or diminished by a proper manipulation of the thumb-turns 12.

What I claim, and desire to secure by Letters Patent, is:

A guage for a spindle comprising a pair of separable frame members adapted to engage a spindle so as to be rotatable thereon, a tubular support projected from one side of one of said frame members in parallel relation with the axis of such spindle, an L-shaped rod held at one end in said support, means for holding said rod in adjustable positions in said support, a gauge mechanism attached to the free end of said rod, and means for holding said gauge mechanism in adjusted positions on said rod to or from such spindle.

In testimony whereof I affix my signature.

HENRY WOCHNER.